United States Patent [19]
Bader et al.

[11] Patent Number: 6,090,318
[45] Date of Patent: Jul. 18, 2000

[54] PROCESS FOR CONTROLLING THE HOT-RUNNER HEATING OF A MULTICAVITY INJECTION MOULD

[75] Inventors: Christopherus Bader, Neftenbach; Markus Zanetti, Frauenfeld, both of Switzerland

[73] Assignee: K.K. Holding AG, Winterthur, Switzerland

[21] Appl. No.: 09/149,101

[22] Filed: Sep. 8, 1998

[30] Foreign Application Priority Data

Sep. 16, 1997 [CH] Switzerland .............................. 2180/97

[51] Int. Cl.[7] .................................................... B29C 45/76
[52] U.S. Cl. ....................... 264/40.1; 264/40.5; 264/40.7; 264/297.2; 264/328.8; 264/328.15; 425/144; 425/145; 425/549
[58] Field of Search ................................... 264/40.1, 40.5, 264/40.7, 328.1, 328.8, 297.2, 328.14, 328.15; 425/145, 549, 143, 144

[56] References Cited

U.S. PATENT DOCUMENTS

| | | |
|---|---|---|
| 5,356,575 | 10/1994 | Krosse et al. . |
| 5,419,858 | 5/1995 | Hata et al. .............................. 264/40.6 |
| 5,514,311 | 5/1996 | Shimizu et al. . |
| 5,518,389 | 5/1996 | Nonomura et al. ..................... 264/40.6 |
| 5,556,582 | 9/1996 | Kazmer .................................. 264/40.1 |
| 5,648,105 | 7/1997 | Shimazu et al. ....................... 264/40.5 |
| 5,665,283 | 9/1997 | Bader . |
| 5,766,526 | 6/1998 | Watanabe .............................. 264/40.5 |
| 5,773,038 | 6/1998 | Hettinga ............................. 264/328.15 |
| 5,993,704 | 11/1999 | Bader .................................... 264/40.1 |

FOREIGN PATENT DOCUMENTS

| | | |
|---|---|---|
| 41 40 392A1 | 6/1993 | Germany . |
| 52-31903 | 8/1977 | Japan . |

*Primary Examiner*—Jill L. Heitbrink
*Attorney, Agent, or Firm*—Barnes & Thornburg

[57] ABSTRACT

To obtain simultaneous filling of all cavities (K1–K4) in multicavity injection moulds, the mould cavity pressure (p) patterns in all cavities (K1–K4) are detected and the times (t1–t4) measured from the beginning of filling till a suitably chosen reference pressure (pR) is reached for each cavity (K1–K4). By interventions in the individual heating systems of the individual hot runners (5), the temperatures in these are altered to bring the measured times of the individual cavities more in line.

12 Claims, 4 Drawing Sheets

PROCESS FOR CONTROLLING THE HOT-RUNNER HEATING OF A MULTICAVITY INJECTION MOULD

BACKGROUND AND SUMMARY OF THE INVENTION

The invention concerns a process injection mould and more specifically for multicavity injection mould. A process of this kind is known from the article "Computerized Mold Diagnostics and Closed Loop Molds" in the periodical "Injection Moulding", March 1997, pages 87/88. Here it is described how, in order to maintain the desired pressure range in the individual cavities, the temperatures in the individual hot runners are adjusted according to the measured individual mould cavity pressures.

It is known that the quality of plastic injection mouldings depends to a large extent, among other factors, on reaching the changeover point at the end of the filling phase as accurately as possible at the moment when the mould cavity has just been filled volumetrically. Consequently with multicavity moulds, a good and uniform quality can be achieved only if all cavities are filled volumetrically at the same time. The purpose of the invention is to assure uniform filling of all cavities of a multicavity mould. This is accomplished with the process of the present invention. However the use of the process according to the invention requires that all cavities of a mould be as equal as possible in size and geometry.

Measuring the times for reaching any reference pressure, which must lie only above the pressure at the end of the filling phase and below the lowest maximum pressure in a cavity, yields exact and reliable knowledge of the time at which the volumetric filling is reached in the individual cavities. Moreover, it reveals which cavities are "leading" and which are "lagging" when filling. Such detailed information cannot be obtained with the state-of-the-art pressure range control mentioned above, because for example with a maximum pressure regulation pressures may be measured in cavities in which the melt has already solidified. This has been demonstrated in tests.

A very simple though relative time-consuming control of the mould filling can be achieved with the new process by lowering the hot-runner temperatures of the first cavities filled, i.e. leading in their pressure patters, and/or raising those of the cavity last filled, i.e. lagging.

To preclude errors as far as possible in controlling the fillings of the individual cavities, due typically to pressure variations or other disturbances, the pressure/time integral formed for each cavity can be taken into account for controlling the individual hot-runner temperatures within a predetermined time interval which is the same for all cavities. The time interval must begin at the latest at the changeover point of the cavity first filled, and end when the maximum pressure of the cavity last filled is reached. The pressure/time integral ascertained may be used similarly in a stepwise approximation, as described above for the time measurements.

A further optimization is possible by detecting the maximum mould cavity pressure in each cavity in addition, and taking this into account in the hot-runner temperature control.

As mentioned, the indicated iterative approximations to a simultaneous filling of all cavities are relatively lengthy and may under circumstances call for a greater number of approximation steps. A simultaneous filling of all cavities can be arrived at more quickly by forming a fictitious mean from the time, integral and/or maximum pressure values obtained for all cavities and taking the differences between these and the fictitious mean, regulating the individual hot-runner temperatures so that the resulting differences tend towards zero. This procedure lends itself to the use of fuzzy logic. Thus by detecting the magnitudes of the particular differences, it becomes possible to intervene selectively and differently in the heating of the individual hot runners in a simple fashion.

For determining the changeover points needed, the use of an automatic changeover point detection system has proved efficacious, as described for example in EP-A-0707.936 or in Swiss patent application 1997 0939/97 dated Apr. 23, 1997 corresponding to U.S. patent application Ser. No. 09/050,394 filed Mar. 31, 1998 now U.S. Pat. No. 5,993,704.

It may also be useful to measure and control the mean melt temperature setpoint which depends on the material not only in the runner in the familiar manner, but also to measure the temperatures in the individual hot runners and take the mean of these and use it to maintain the temperature range given by the melt material. This ensures that when adjusting individual hot runners using the process according to the invention, there will be no departure outside the mean melt temperature range dictated by the material. If there is a tendency towards this, on the strength of the mean value formation, the temperatures in the individual hot runners can be raised or lowered together.

Other objects, advantages and novel features of the present invention will become apparent from the following detailed description of the invention when considered in conjunction with the accompanying drawings.

DESCRIPTION OF THE PREFERRED EMBODIMENTS

Figure 1:
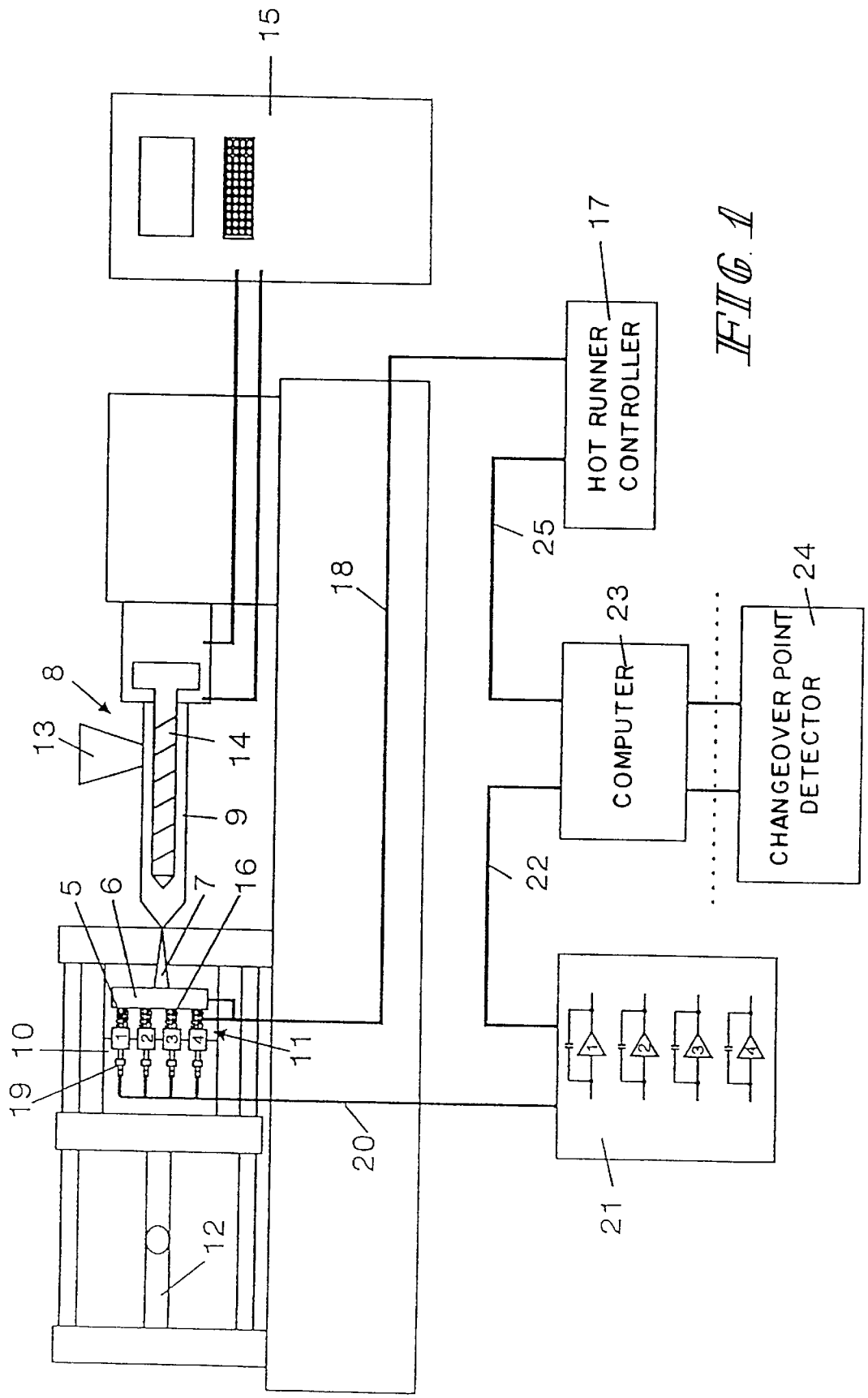
FIG. 1 shows schematically an installation for applying the new process.

The injection moulding machine in FIG. 1 has a metal mould 10 enclosing a hollow cavity 11. The two-piece mould 10 is opened and closed typically by a hydraulic closing unit 12. The cavity 11, in which the mouldings take shape, is formed by four cavities 1 to 4 of identical size and geometry, each connected via a hot runner 5 to a runner 6. Through the gate 7, the runner 6 communicates with the nozzle of the injection unit 8.

For preparing and injecting the melt, the unit 8 has an injection cylinder 9, with a hopper 13 at the top for feeding the granulated injection moulding material and a screw 14 arranged axially displaceable and rotatable inside it. The motion of the screw 14 is controlled as usual from a control unit 15.

The runner 6 is heatable by conventional means using a heating device, not shown, operated by a commercial hot runner controller 17. A temperature sensor, not shown, in the runner 6 controls the runner heating so that an adjustable temperature range dictated by the melt material is maintained.

Each hot runner 5 has separate heating, shown symbolically as a heating coil 16. These separate heatings 16 are likewise served by a hot runner controller 17. Furthermore each hot runner 5 is provided with its own temperature sensor, not shown. From the measured absolute temperatures in the individual hot runners 5, a mean value is formed and compared with the temperature range adjusted according to the material. If the mean of the temperatures in the hot runners 5 tends to depart from the adjusted temperature range, this value is regulated by uniformly throttling or increasing the heating of all coils 16 via the controller 17, so that it stays within the adjusted mean temperature range. By a connection 18, shown schematically between the hot runner controller 17 and the mould cavity 11, the exchange of the signals needed to regulate the heating coils is indicated.

To apply the process according to the invention, each cavity 1–4 is equipped with a pressure sensor 19. Most of the familiar kinds of pressure sensors may be used for this, though piezoelectric sensors have proved to be especially suited. Via a link 20, the measured values from the pressure sensors 19 pass to a charge amplifier 21 for each cavity 1–4, from which they are transmitted as voltages over a line 22 to a computer 23 for signal processing and evaluation. In addition, the computer 23 is linked with an automatic changeover point detection 24. After processing and evaluating its input signals, the computer 23 issues control commands via a link 25 shown schematically, via which the actual temperatures of the individual cavities 1–4 are led to it as additional input signals from the controller 17, for individually controlling the temperatures in the hot runners 5 to the hot runner controller 17. This throttles or increases the heating of the individual heating coils 16.

Figure 2:
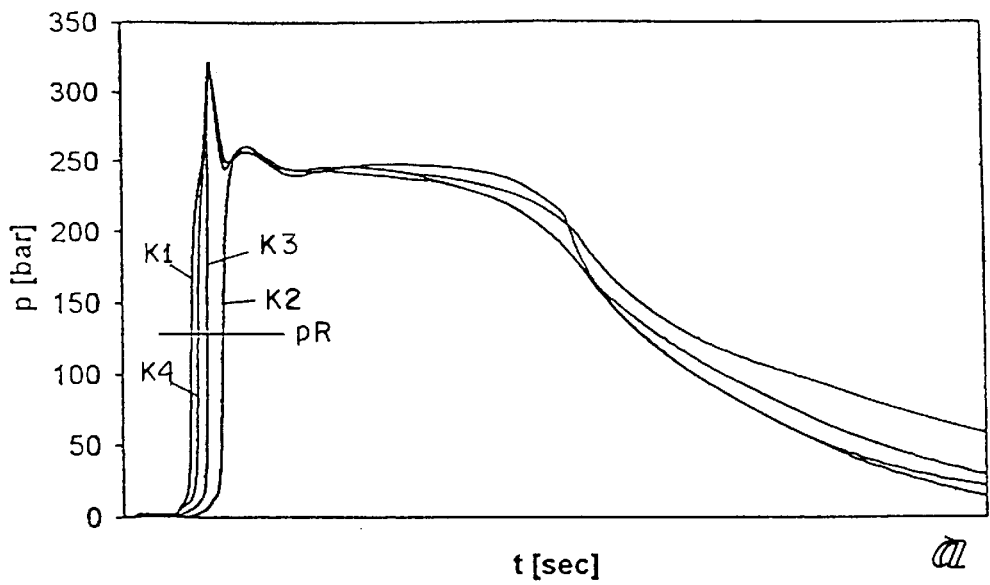
FIGS. 2a–c and 3a–c plot the mould cavity pressure patterns in the various cavities versus time, FIG. 2 showing the entire pressure pattern during one injection cycle and FIG. 3 the relevant part for the new process around the changeover points and the maximum pressures, with the time scale stretched about fourfold compared with FIG. 2.
Figure 2:
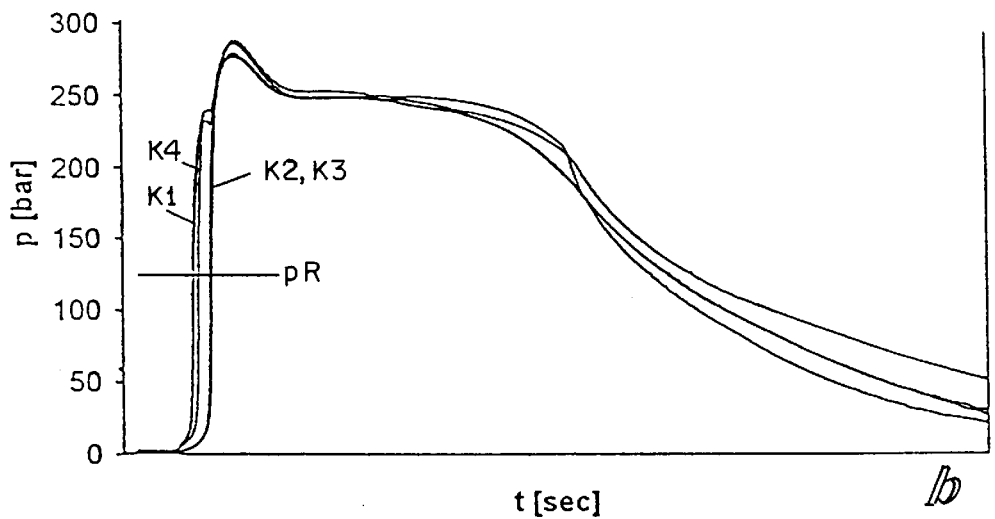
Figure 2:
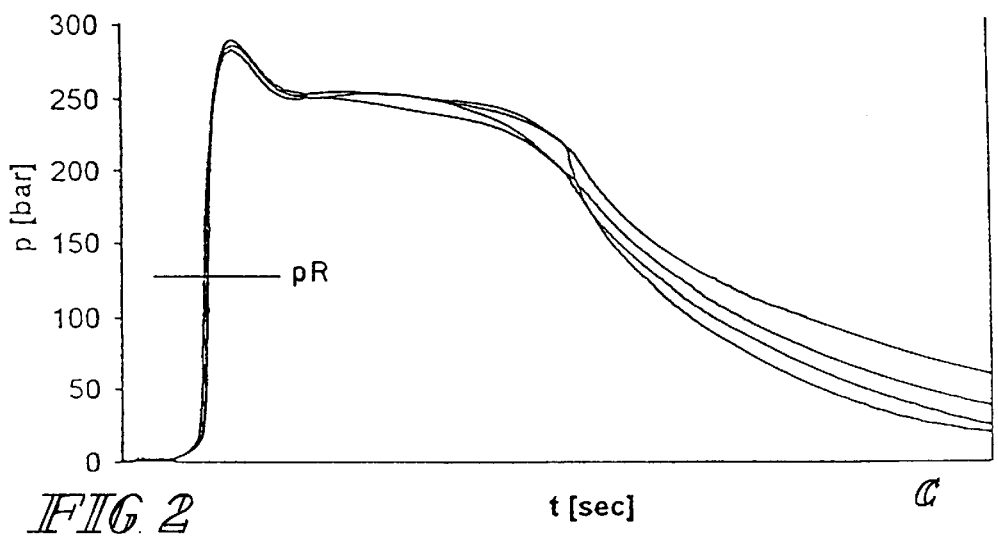
Figure 3:
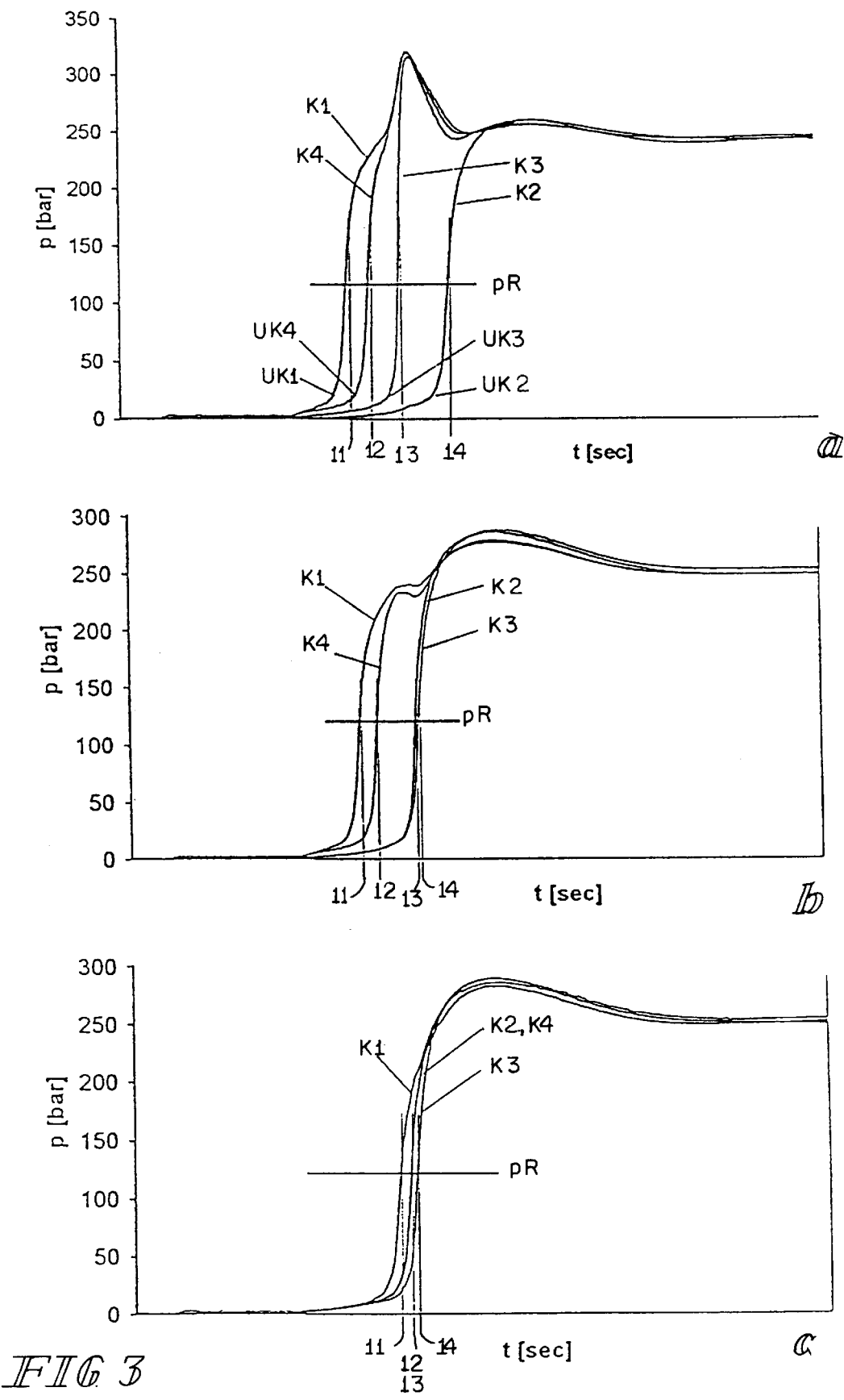

With the basic typical embodiment shown in FIGS. 2 and 3, injection mouldings are produced from styrene-butadiene. For this material the mean processing temperature is 250° C., so that the temperature range to be maintained lies roughly between 240° C. and 260° C. for example.

In the diagrams of FIGS. 2 and 3, the mould cavity pressure p is plotted in bar for each cavity K1 to K4 against the time t in seconds. The diagrams of FIGS. 2a and 3a reproduce the pressure patterns of an unregulated injection cycle, run after reaching the mean processing temperature.

The diagrams of FIGS. 2b and 3b show the pressure curves of an intermediate state plotted for experimental and demonstration purposes only, where the filling time of cavity K2 is brought into line with that of the other cavities essentially by raising the temperature in its hot runner 5.

In the diagrams of FIGS. 2c and 3c a cycle is plotted in which the effect of the fully applied process is reproduced.

While FIG. 2 provides only an overall impression of the measured pressure patterns, the process is described again with reference to FIG. 3.

In all diagrams a–c, the same reference pressure pR is entered, which according to the invention lies on the one hand above the final pressures of the filling phases at the changeover point UK1–UK4 (FIG. 3a), ascertained by the automatic changeover point detection 24 for example, while on the other hand the reference pressure is lower than the lowest maximum pressure pMK2 (FIG. 3a) in one cavity—here K2.

From FIG. 3a for the first injection cycle plotted, it will be seen that the cavity K1 is filled first and reaches the reference pressure pR at the time t1. The next cavity to be filled is K4, where the reference pressure pR is reached at time t2. The pressure pattern in cavity K3 exceeds the reference pressure pR at time t3, while with strongly retarded or lagging filling of K2 the pressure pR is reached only at t4.

Before plotting diagram 3b, the process according to the invention was applied only incompletely in the computer 23, using the difference formation between the time t4 and the fictitious time mean tM, so that the heating for cavity K2 was raised by a certain amount. In the cycle performed after this and plotted in FIG. 3b, the pressures in cavities K1 and K4 reach the reference pressure pR after almost unchanged times t1 and t2. The increased heating for cavity K2, causes the pressure pR to be exceeded in this cavity at the time t3 shortly before t4, which now belongs to cavity K3.

By throttling the heating for cavity K1, again triggered by the difference between the actual value t1 and the fictitious time mean tM, the lead of the filling on this cavity is reduced, as is clear from FIG. 3c. Thus the ultimate effect of the new process is to bring the filling times of the individual cavities very close together, so that the pressure patterns for cavities K2 and K4 are virtually congruent.

When adjusting with the individual heatings of the various cavities, effects on the temperatures in neighbouring hot runners 5 or cavities K1 to K4 cannot be prevented entirely. Consequently, the filling times t, till the reference pressure pR is reached, are shifted slightly also for cavities whose heating remains unchanged from previous cycles.

In the computer 23, besides the pressure curves, their time integrals or the maximum pressure values may be taken, for example with the help of similar difference formations compared with fictitious mean values in addition to the evaluation, in order to identify troubles like severe pressure fluctuations which did not occur in the series of test cycles described, and prevent the computer 23 reaching false conclusions. For exploiting the process extended in this way, the methods of fuzzy logic have proved useful.

Figure 4:
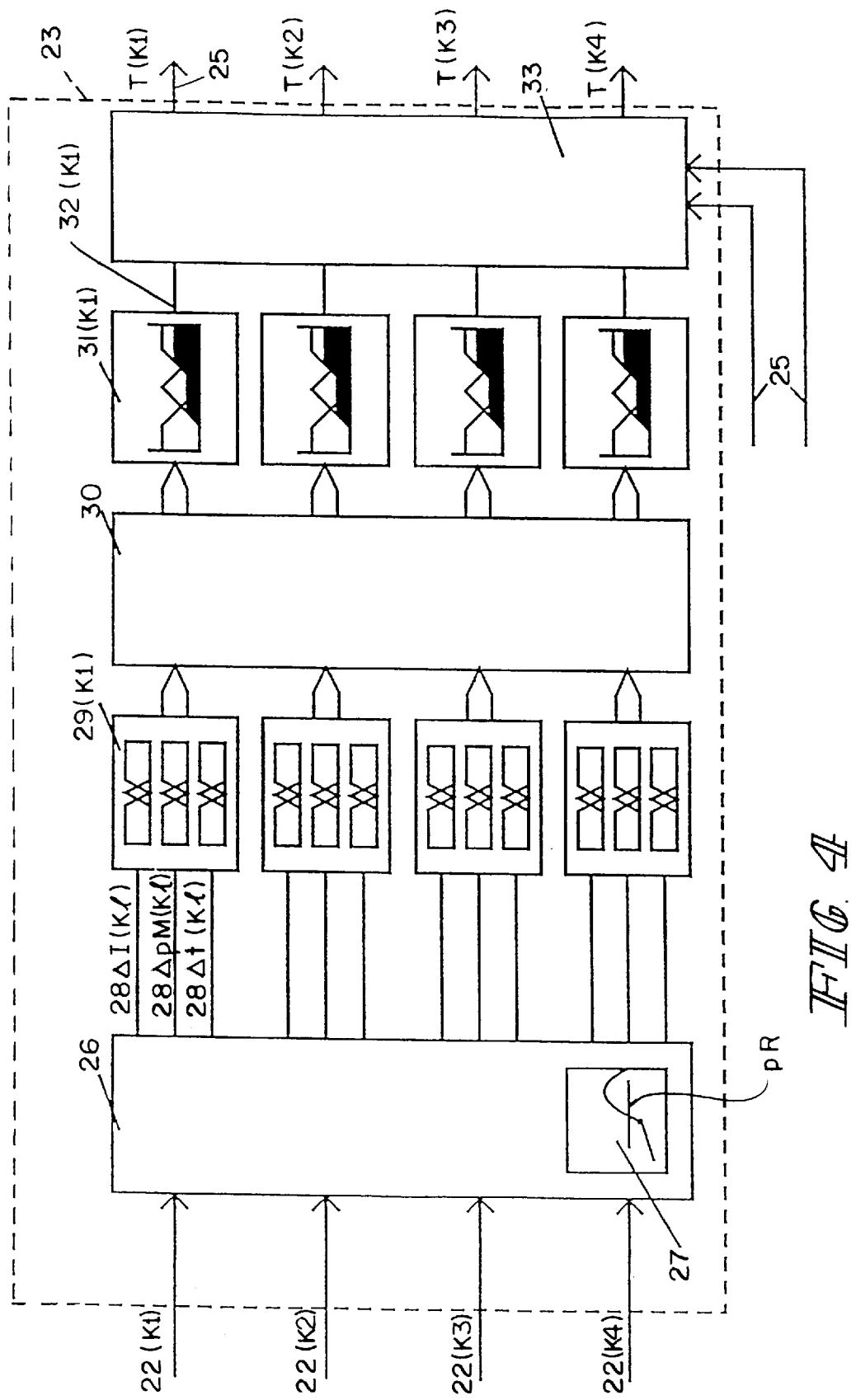
FIG. 4 shows schematically an example of how the mould cavity pressures can be processed into the required setpoint temperatures for the hot runners in the evaluation unit with recourse to fuzzy logic.

In the example shown in FIG. 4, where the input signals of the computer or evaluation unit 23 are processed with the help of fuzzy logic, the measured values of the mould cavity pressures in each cavity 1 to 4, converted into voltages, pass via the links 22 separately for the cavities 1 to 4 into a first processing stage 26 of the evaluation unit or of the computer 23.

The processing of these input signals in the computer 23 will now be described in detail for the first cavity K1. It is performed analogously for the other cavities K2 to K4.

In stage 26, a reference pressure pR is fixed automatically as indicated at 27, triggered by the automatic changeover point detection 24 in conjunction with the lowest peak or maximum pressure pM measured. The reference pressure is selected with advantage so that it lies in the lower half, or better still in the lower third, of the pressure difference between the pressure at the changeover point and the lowest peak pressure pM, pMK2 in the typical embodiment shown in FIG. 3a.

Further, in stage 26, the times t1 to t4 are first detected for each cavity K1 to K4 in which the reference pressure is reached in each of these cavities. From the measured times, a fictitious time mean is then formed, and for each cavity K1 to K4 the difference Δt between the times ascertained for them and the fictitious mean value. For the cavity K1, this difference ΔtK1 is led via a link 28 to a processing element 29K1 assigned to this cavity.

In the same way, in the first stage 26 the pressure/time integral I for the cavity K1 is formed over a same time interval for all cavities K1 to K4. The time interval begins at the latest at the changeover point of the cavity K1 first filled (FIG. 3a) and ends between the changeover point of the cavity K2 filled last (FIG. 3a) and the time when its maximum pressure pMK2 is reached. From this integral I for all cavities K1 to K4, a fictitious mean value and the differences $\Delta I$ between the individual values and the mean are formed, which are then led via a second link 28$\Delta$IK1 likewise to the processing element 29K1.

Finally the maximum or peak pressure pM determined for the cavity K1 considered is processed similarly, leading to the difference $\Delta$pMK1 via the appropriate link 28 to the element 29K1.

In the elements 29, 30 and 31 fuzzification, fuzzy inference and defuzzification of the infed difference values ensue, in accordance with the familiar methods and rules of fuzzy logic.

If there is a mismatch of the temperature in cavity K1, i.e. in the hot-runner temperature before this cavity, as output signal from the fuzzy logic, a temperature difference representing the mismatch in magnitude and sign is put in via a link 32 to the last processing stage 33 of computer 23.

As further input signals to the stage 33, the adjustable mean melt temperature setpoint depending on the material and the actual temperature values in the individual cavities K1 to K4, i.e. in the hot runners 5, are routed via the signal link 25 shown schematically in FIG. 1.

From the input signals described above, in stage 33 new setpoints for the temperatures T(K1) to T(K4) in each cavity K1 to K4 or in the associated hot runners 5 are calculated, taking into account the mean temperature setpoint dictated by the material, and likewise transmitted to the hot-runner controller 17 via link 25. From the controller the throttlings or increases in the individual hot runner heatings needed to maintain or reach the new temperatures in the cavities are initiated, bringing the mean level of the new temperatures of all cavities into line with the adjustable mean melt temperature setpoint. To prevent continuous fluctuation in the hot-runner temperatures, however, the new temperature setpoints for the various cavities are first compared with the measured actual temperatures and the old setpoints, and only after this comparison in stage 33 of the computer is it decided whether a command should be given to the hot-runner controller 17 to alter the setpoint for a cavity.

Of course the invention is not confined to the typical embodiment with only four cavities described here, and/or to the evaluation and processing of the measured mould cavity pressures indicated. Rather it is applicable above all to multicavity injection moulds, while other evaluation processes may be employed to determine the temperature setpoints for the individual cavities.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A process for monitoring and controlling the filling of plastic injection moulds with multiple cavities fed with molten material via a hot-runner system whose temperature is controllable, the process comprising:

measuring pressure in each cavity;

measuring a time interval from a fixed point in a filling phase to when a certain adjustable reference pressure of the mould cavity pressure is reached in each cavity;

the reference pressure lying above a measured pressure at the end of a volumetric filling phase but below a measured lowest maximum pressure in the cavities; and adjusting the temperatures in the hot runners individually so that the measured time intervals are kept close with their differences tending towards zero.

2. A process according to claim 1, including determining within a predetermined time period for all cavities, beginning at the latest at a changeover point determined for the cavity filled first and ending between a changeover point determined for the cavity filled last and the reaching of its maximum pressure, the pressure/time integral for each cavity and taking the integral into account in the adjusting of the hot runner temperatures.

3. A process according to claim 2, wherein the maximum mould cavity pressure is detected in each cavity and is taken into account in the adjusting of the hot runner temperatures.

4. A process according to claim 2, including determining a fictitious mean value from each of the time interval, integral and/or maximum pressure values obtained, determining the difference between the values obtained and the fictitious mean value, and finally adjusting the hot runner temperatures so that these differences tend towards zero.

5. A process according to claim 4, wherein the adjusting of the hot runner temperatures is accomplished with the aid of fuzzy logic methods.

6. A process according to claim 1, including stepwise lowering of the hot runner temperature of the first cavity filled and/or raising the hot runner temperature of the last cavity filled.

7. A process according to claim 2, wherein the changeover points for the individual cavities are detected by an automatic changeover point detecting system.

8. A process according to claim 1, wherein an adjustable mean temperature setpoint of the molten material, which depends on the material, is measured and adjusted by taking the mean of the temperatures measured in the individual hot runners and using the mean temperature to maintain the predetermined temperature range dictated by the material.

9. A process according to claim 1, wherein the maximum mould cavity pressure is detected in each cavity and taken into account additionally in the adjusting of the hot runner temperatures.

10. A process according to claim 9, including forming a fictitious mean value from each of the time, and/or maximum pressure values obtained, forming the difference between the values obtained and the fictitious means, and finally adjusting the hot runner temperatures so that these differences tend towards zero.

11. A process according to claim 1, including forming a fictitious mean value from the time values obtained, forming the difference between the values obtained and the fictitious mean, and finally adjusting the hot runner temperatures so that these difference tend towards zero.

12. A process according to claim 1, wherein the adjusting of the hot runner temperatures being accomplished with the aid of fuzzy logic methods.

* * * * *